United States Patent [19]

O'Pray et al.

[11] 4,001,135

[45] Jan. 4, 1977

[54] FLUORINE GENERATING SOLID FORMULATION FOR USE IN CHEMICAL LASERS

[75] Inventors: John E. O'Pray; Ronald E. Channell, both of Edwards; Francisco Q. Roberto, Lancaster, all of Calif.

[73] Assignee: The United States of America as represented by the Secretary of the Air Force, Washington, D.C.

[22] Filed: July 1, 1975

[21] Appl. No.: 592,296

Related U.S. Application Data

[63] Continuation-in-part of Ser. No. 537,492, Dec. 30, 1974, abandoned.

[52] U.S. Cl. .......................... 252/187 R; 149/19.3; 149/109.2; 149/119; 252/188; 252/188.3; 280/741
[51] Int. Cl.² ......................................... C06D 5/06
[58] Field of Search ............... 252/187 R, 188.3 R, 252/188; 149/19.3, 109.2, 109.4, 119; 423/262, 489; 280/150 AB

[56] References Cited

UNITED STATES PATENTS

| | | | |
|---|---|---|---|
| 3,183,061 | 5/1965 | Claassen et al. | 423/262 |
| 3,326,638 | 6/1967 | Cleaver | 423/489 |
| 3,513,043 | 5/1970 | Burnside | 149/19.3 |
| 3,853,645 | 12/1974 | Kaufman et al. | 149/19.3 |
| 3,876,477 | 4/1975 | Eldridge et al. | 149/19.3 |

OTHER PUBLICATIONS

Chemical Abstracts, vol. 72 (1972), p. 549, No. 85784t.

*Primary Examiner*—Benjamin R. Padgett
*Assistant Examiner*—Irwin Gluck
*Attorney, Agent, or Firm*—Joseph E. Rusz; William J. O'Brien

[57] ABSTRACT

A solid fluorine generating composition for use in a chemical laser which comprises a mixture of a xenon fluoride and a hydrocarbon or fluorohydrocarbon polymer.

4 Claims, No Drawings

FLUORINE GENERATING SOLID FORMULATION FOR USE IN CHEMICAL LASERS

STATEMENT OF GOVERNMENT INTEREST

The invention described herein may be manufactured and used by or for the Government for governmental purposes without the payment of any royalty thereon.

BACKGROUND OF THE INVENTION

This application is a continuation-in-part of Ser. No. 537,492, filed on Dec. 30, 1974, now abandoned.

This invention relates to chemical lasers and, more particularly, to a fluorine generating solid formulation for use therewith.

Laser sytems that use a gaseous medium to generate a lasing action by means of a chemical reaction are well known. In general, the technique used for generating a chemically induced lasing action involves the step of diffusing a first reactant gas, such as hydrogen or deuterium, into a supersonic jet flow containing a second reactant gas, such as fluorine. The two gases react chemically to provide a sustained high speed flow of vibrationally excited gaseous product with the requisite population inversion and lifetime needed to create a lasing action. The vibrationally excited gas flows into an optical laser cavity where the laser action is actually generated.

The chemical laser systems have proven to be useful for a number of applications. Heretofore, the gaseous reactants were supplied from liquid mediums. The attendant problems associated with storing, maintaining and delivering the liquids to an airborne chemical laser system have hindered the utilization of chemical lasers for military airborne laser applications.

With the present invention, however, it has been found that the problems associated with the use of a liquid medium for supplying gaseous reactants have been overcome by the development of the fluorine generating compositions of this invention. These compositions possess a demonstrated capability for supplying high purity fluorine gas to a chemical laser. For potential applications of chemical lasers to military systems, the inherent storability, simplicity and compactness of solid gas generating compositions are highly attractive.

SUMMARY OF THE INVENTION

In accordance with this invention, it has been found that a solid formulation having a particular compositional content is capable of providing the necessary fluorine required to generate a lasing action through the medium of a chemical reaction. The solid formulation of this invention when ignited produces dissociated fluorine as a primary product during self-sustaining combustion. The formulation consists of a mixture of a powdered xenon fluoride oxidizer selected from the group consisting of xenon hexafluoride, xenon tetrafluoride and xenon difluoride and a powdered hydrocarbon polymer fuel selected from the group consisting of polyethylene and polytetrafluoroethylene. The ratio of oxidizer to fuel in the formulation of this invention is from about one to seven moles of oxidizer to one mole of fuel. Optimum results are achieved, however, by using mixtures in which the xenon difluoride is present in a ratio of about 3.5 to 7.0 moles of difluoride to one mole of polyethylene or 2.0 to 4.0 moles of difluoride to one mole of polytetrafluoroethylene: In the case of xenon tetrafluoride a ratio of about one to two moles of tetrafluoride to one mole of polytetrafluoroethylene is preferred. The formulation is intimately mixed and then pressed into a cohesive solid composition. The combustion products of this formulation are fluorine, xenon, and carbon tetrafluoride, plus hydrogen fluoride when a hydrogen containing polymer is used. The combustion temperatures and, therefore, the degree of fluorine dissociation can be readily controlled by altering the ratio and type of xenon fluoride and hydrocarbon polymer fuel. This invention eliminates the complexities encountered during the maintenance and manipulation of the liquid gas generating systems relied on heretofore for providing gaseous reactants to chemical lasers.

Accordingly, the primary object of this invention is to provide a solid composition capable of supplying the gaseous reactants for a chemical laser system.

Another object of this invention is to provide a solid formulation which, when ignited, is capable of producing dissociated fluorine.

Still another object of this invention is to provide a fluorine generating solid formulation for use in a chemical laser.

A further object of this invention is to provide a simple, storable source of fluorine for use in airborne applications of chemical lasers.

The above and still further objects and advantages of the present invention will become more readily apparent upon consideration of the following detailed description thereof.

DESCRIPTION OF THE PREFERRED EMBODIMENTS

The above defined objects are accomplished by the composition of this invention which comprises a powdered mixture of a xenon fluoride and a hydrocarbon polymer fuel having a mole ratio of from one to seven moles of xenon fluoride to one mole of hydrocarbon polymer.

The preparation of the fluorine generator formulation of this invention is simple and straightforward. The crystalline oxidizer, a xenon fluoride, is first ground to a fine powder in a dry nitrogen atmosphere. All of the formulations presented in this disclosure are very reactive with moisture, and thus must be handled in a moisture free atmosphere at all times. Therefore, all formulation preparations are conducted in a nitrogen atmosphere dry box equipped with a drying train typically operating at a very low moisture level (minus one hundred degrees centigrade frost point). The typical dry box nitrogen atmospheric conditions are a pressure of 13.3 psia and a temperature of fifteen to twenty degrees centigrade. All formulation ingredients are seived separately to a particle size of less than ninety mesh. The quantity of each ingredient for the selected formulation is then weighed out separately. All of the ingredients are placed in an appropriate size teflon beaker in preparation for mixing. The ingredients are thoroughly mixed in the teflon beaker by stirring with a teflon coated spatula. Approximately fifteen minutes mixing time is required. The thoroughly mixed formulation is pressed into a cohesive solid grain in a ⅜ inch diameter by ½ inch deep cylindrical sample container employing a packing pressure of 1800 psi delivered by a standard mechanical press. Ignition of the sample is readily achieved using a Nichrome hotwire technique in which an electrical current of sufficient magnitude to heat the Nichrome wire to the ignition temperature of the sample is passed through the wire which is in physical contact with the sample surface.

The theoretical behavior of the gas generating composition of this invention composed of xenon tetrafluoride and polytetrafluoroethylene fuel is explained by the following combustion reaction equation:

$$2XeF_4 + -C_2F_4- \rightarrow 4F + 2Xe + 2CF_4$$

For the range of ingredient mole ratios of interest for chemical lasers, the flame temperatures are high enough to dissociate most of the free fluorine. Under these conditions, the general empirical reaction equation for equation (I) above can be expressed as follows:

$$N(XeF_4) + (-CF_2-CF_2-) \rightarrow 4(N-1)F + N(Xe) + 2 CF_4$$

where N = number of moles

Extensive theoretical equilibrium thermodynamic calculations have been carried out for this class of formulations for values of N from 1 to 2. The calculations were performed using a Theoretical Specific Impulse computer program using standard thermodynamic data, including heats of formation of $-51.5$ K cal/mole and $-195.0$ Kcal/mole for $XeF_4$ and $(CF_2)_2$, respectively. These calculations at 6 psia total pressure indicated that only free fluorine, carbon tetrafluoride, and xenon are produced over the temperature range of interest for chemical lasers.

The predicted mole percentage composition of the gaseous combustion products for five values of N are given in Table I.

TABLE I

| mole percent | N=2.0 | N=1.9 | N=1.8 | N=1.7 | N=1.6 |
|---|---|---|---|---|---|
| F | 45.6 | 46.5 | 45.4 | 43.0 | 40.0 |
| $F_2$ | 2.9 | 1.0 | 0.2 | 0.1 | 0.0 |
| Xe | 25.8 | 25.6 | 25.8 | 26.2 | 26.7 |
| $CF_4$ | 25.7 | 26.9 | 28.6 | 30.8 | 33.3 |
| T, °K | 1396 | 1518 | 1699 | 1916 | 2152 |

The combustion products composition was experimentally determined for several ratios of xenon tetrafluoride to polytetrafluoroethylene. This analysis was conducted using a molecular beam type of time-of-flight mass spectrometer which is capable of directly sampling the combustion products from a sample burning at atmospheric pressure. A helium purge around the combustion sample eliminated atmospheric contamination. However, the helium purge also mixed with the combustion products which reduced the gas temperature, and therefore, increased the ratio of molecular to atomic fluorine through fluorine atomic recombination. Because of this purge quenching effect, the comparison of theoretical and experimental results given in Table II includes the parameter F total which is the total free fluorine expressed entirely as atomic fluorine.

| F Total | 50.0 | 32.6 |
|---|---|---|
| F | 45.6 | 19.2 |
| $F_2$ | 2.9 | 8.0 |
| Xe | 25.7 | 35.2 |
| $CF_4$ | 25.7 | 30.9 |
| HF | 0.0 | 6.7 |

Losses of fluorine due to reaction with the Nichrome ignition wire and the walls of the sampling apparatus are believed to have contributed to the lower observed fluorine concentrations.

A similar comparison of theoretical calculations versus experimental results has been compiled on the xenon difluoridepolytetrafluoroethylene fuel system. This comparison shows trends analogous to those of the xenon tetrafluoride-polytetrafluoroethylene system discussed heretofore.

To verify that DF lasing can occur with a laser gas mixture containing the hydrogen fluoride, xenon and carbon tetrafluoride secondary constituents which are introduced by solid formulations composed of the xenon fluoride and a fluorocarbon or hydrocarbon polymer fuel, low power lasing tests in the deuterium fluoride (DF) direct chemical lasing mode have been conducted. The supersonic flow cavity mixing nozzle array used for the lasing demonstrations is typical of the high performance laser nozzle designs currently utilized. The individual nozzles are two-dimensional converging diverging "wedge" nozzles. Large nozzles flowing a hot stream of dissociated fluorine plus diluent gases and precombustor products alternate with small nozzles flowing deuterium fuel. In the small nozzle array used for the lasing tests, there are two fluorine nozzles and three deuterium nozzles. The copper nozzles are water cooled. The nozzle length (parallel to the throat slip) is 1 inch. The two fluorine nozzles have an average throat height of 0.0058 inches and an average geometric expansion ratio of 13.8 with a twelve degree half angle. The three deuterium nozzles have an average throat height of 0.0039 inches, an averge geometric expansion ratio of 11.4, and a 15° half angle.

The low power DF laser utilizes a conventional, stable optical resonator. The mirrors are mounted externally with the beam passing into the low pressure laser cavity region through Barium Fluoride windows inclined at Brewster's angle. The optical cavity length is 72 centimeters with a 98 percent reflective, one inch diameter, gold coated mirror of 3.0 meter radius of curvature at one end and a 93 percent reflective germanium output coupler 2.0 inches in diameter with 4.0 meter radius of curvature at the other end of the optical cavity. Laser power is measured by a Coherent Radiation Model 201 Broadband Power Meter mounted directly behind the output coupler. The centerline of the optical cavity was located 0.125 inch downstream of the nozzle exit plane for a test which demonstrated that lasing could be obtained with Xenon, carbon tetrafluoride and hydrogen fluoride as secondary constituents of the laser gas stream.

For these lasing tests to verify that Xenon, carbon tetrafluoride and hydrogen fluoride are permissable constituents of a DF laser gas stream, the laser reactants were supplied from commercial compressed gas cylinders. All gases were of greater than 99 percent purity. The nitrogen trifluoride oxidizer and hydrogen fuel were injected into the precombustor through an impinging triplet injector. The Argon diluent plus the xenon and carbon tetrafluoride secondary constituents were injected into the precombustor together through an array of orifices. The deuterium cavity fuel was supplied to the three deuterium nozzles through a manifold. The gas flow rates in units of liters per minute (S.T.P.) were: $4.136NF_3$, $4.539H_2$, $1.612CF_4$, $8.401Ar$, $1.000Xe$, $111D_2$. For the Xenon plus carbon tetrafluoride demonstration test, at the middle of the four second test the laser power was 0.32 Watts, the precombustor pressure was 9.0 psia, the deuterium nozzle stagnation pressure was 6.25 psia, and the laser cavity pressure was 3.7 Torr. This test demonstrated that stable lasing could be obtained with substantial concentrations of carbon tetrafluoride, hydrogen fluoride, and xenon in the laser gas stream. These three species are the only gases introduced by formulations composed of an xenon fluoride and a hydrocarbon of fluorocarbon polymer fuel which are not necessarily present in conventional DF chemical lasers. Therefore, this successful lasing test using bottled gases demonstrates that these solid formulations could indeed be utilized as fluorine generators for chemical lasers.

The present invention provides a means for combining an xenon fluoride oxidizer and a hydrocarbon or fluorocarbon polymer fuel into a composition of matter which will sustain combustion and yield dissociated fluorine as a primary product. In addition, all of the other combustion products are known to have no deleterious deactivation effects on hydrogen fluoride or deuterium fluoride chemical laser operation. The invention provides for a stable, storable, and simple source of fluorine for use in airborne chemical laser systems. By eliminating the hazards of handling highly reactive elemental fluorine, this invention removes a major obstacle to the use of chemical lasers for airborne missions. In addition, this invention provides a simple solution to the problem of dissociating molecular fluorine into fluorine atoms for use in hydrogen fluoride or deuterium fluoride chemical lasers. When operated, using molecular fluorine, these lasers require precombustion of a large fraction of the total fluorine flow in order to dissociate the balance of the fluorine. Because the solid formulation provides dissociated fluorine directly, this invention eliminates the need for a separate precombustor. Furthermore, both the xenon and the carbon tetrafluoride produced by combustion of this formulation are known to have very low rates of colisional deactivation of vibrationally excited hydrogen fluoride or deuterium fluoride molecules. Therefore, the solid formulation eliminates the laser performance penalty due to the production of large concentrations of ground state hydrogen fluoride or deuterium fluoride in a conventional laser precombustor.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. A fluorine generating solid composition comprising a compressed mixture of (a) an xenon fluoride oxidizer selected from the group consisting of xenon tetrafluoride, xenon difluoride and xenon hexafluoride; and (b) a hydrocarbon polymer fuel selected from the group consisting of polyethylene and polytetrafluoroethylene wherein said xenon fluoride oxidyzer is present in a ratio of about 1 to 7 moles of oxidizer to about 1 mole of said fuel.

2. A composition in accordance with claim 1 wherein said xenon difluoride is present in a ratio of about 3.5 to 7.0 moles of difluoride to about 1.0 mole of polyethylene.

3. A composition in accordance with claim 1 wherein said xenon difluoride is present in a ratio of about 2.0 to 4.0 moles of difluoride to 1.0 mole of polytetrofluoroethylene.

4. A composition in accordance with claim 1 wherein said xenon tetrafluoride is present in a ratio of about 1.0 mole to 2.0 moles of tetrafluoride to about 1.0 mole of polytetrafluoroethylene.

* * * * *